United States Patent [19]

Tanno et al.

[11] 4,093,527

[45] June 6, 1978

[54] HYDROGEN GENERATING APPARATUS

[75] Inventors: Kazuo Tanno, Hitachi; Yasumasa Furutani, Katsuta; Takashi Honda, Hitachi; Akira Uenishi, Mito, all of Japan

[73] Assignee: Hitachi, Ltd., Tokyo, Japan

[21] Appl. No.: 635,362

[22] Filed: Nov. 26, 1975

[30] Foreign Application Priority Data

Dec. 13, 1974 Japan ............................... 49-142535

[51] Int. Cl.$^2$ .......................... C25B 1/02; B01D 13/02

[52] U.S. Cl. ................................ 204/129; 204/180 P; 204/301; 204/DIG. 3; 204/DIG. 4; 429/105

[58] Field of Search ............ 204/180 P, 301, DIG. 4, 204/DIG. 3, 129; 429/101, 105, 106

[56] References Cited

U.S. PATENT DOCUMENTS

| | | | |
|---|---|---|---|
| 2,741,591 | 4/1956 | Dewey et al. | 204/301 X |
| 2,860,095 | 11/1958 | Katz et al. | 204/301 X |
| 2,891,900 | 6/1959 | Kollsman | 204/301 |
| 3,091,583 | 5/1963 | Schufle | 204/301 |
| 3,253,955 | 5/1966 | Clampitt et al. | 429/106 X |
| 3,414,437 | 12/1968 | Doundoulakis et al. | 429/101 X |
| 3,540,934 | 11/1970 | Boeke | 429/101 X |
| 3,573,987 | 4/1971 | Knight | 429/105 |

*Primary Examiner*—Arthur C. Prescott

*Attorney, Agent, or Firm*—Beall & Jeffery

[57] ABSTRACT

A hydrogen generating apparatus comprising a cell having a plurality of chambers defined in the cell by cation exchange membranes and anion exchange membranes arranged alternately, a high concentration electrolyte and a low concentration electrolyte being filled alternately in said plurality of chambers, and a pair of electrodes guided into the chambers disposed on both the ends of said cell, respectively, and the open circuit voltage between said electrodes being higher than the decomposition voltage of water.

13 Claims, 7 Drawing Figures

HYDROGEN GENERATING APPARATUS

BACKGROUND OF THE INVENTION

This invention relates to a hydrogen generating apparatus utilizing a concentration cell.

Steam power generation is a power-generating method in which fossil fuel such as coal or petroleum is burnt, steam is generated by utilizing heat formed by combustion, a turbine generator is rotated by steam and electric power is generated by rotation of the turbine. In other words, the energy of fossil fuel is once converted to a thermal energy and the thermal energy is then converted to mechanical power and the mechanical power is converted to electric power. This method for obtaining energy from fossil fuel has the following defects.

The first defect is that the utilization efficiency in conversion of an energy of fossil fuel to other energy is very low. The second defect is that fossil fuel is limited and when all the fossil fuel in the world is consumed, other energy sources will have to be found, and this problem of the conversion of the energy source is now impending. The third defect is that use of fossil fuel inevitably results in discharge of pollutants such as CO, $SO_x$ and $NO_x$, and in order to further continue the use of fossil fuel, development of techniques and equipments for preventing environmental pollution by these pollutants will be necessary.

In view of the foregoing, hydrogen is noted as an energy source of good quality. More specifically, hydrogen generates water and very minute amounts of nitrogen oxides when it is burnt, and the combustion exhaust gas does not contain carbon dioxide gas or sulfur oxide. Accordingly, hydrogen causes no problem of environmental pollution. Further, if hydrogen is fed to a fuel cell, it can be effectively converted to an electric energy, and it can be stored as an energy source. Moreover, hydrogen can be used not only as an energy source but also as an industrial raw material leading to various valuable products.

However, a method capable of producing, at high efficiency, hydrogen free of the above mentioned defects involved in fossil fuel has not been developed. As the conventional method for production of hydrogen, there can be mentioned a water gas preparing method, a petroleum reforming method and a cracking method. However, all of these conventional methods depend on fossil fuel and inevitably use fossil fuel as the raw material. Therefore, the foregoing defects cannot be avoided by the conventional methods of producing hydrogen. Moreover, a chemical method for preparing hydrogen by thermal decomposition of water has not been established, and the prospect of industrialization of this method is still dim.

SUMMARY OF THE INVENTION

It is therefore a primary object of the present invention to provide a novel apparatus for generation of hydrogen.

Another object of the present invention is to provide a novel apparatus for generation of hydrogen, which is capable of generating hydrogen by utilizing a low density energy such as solar energy and exhaust heat energy.

Still another object of the present invention is to provide a novel apparatus for generation of hydrogen capable of generating hydrogen by utilizing a concentration cell.

The hydrogen generating apparatus of the present invention is characterized in that electrodes of a concentration cell having an electromotive force higher than the decomposition voltage of water are electrically connected to each other to cause an electric current to flow between them, whereby hydrogen is generated from one electrode.

The concentration cell comprises at least two chambers partitioned by an ion exchange membrane, electrolytes differing in their concentration, which are contained in said chambers, respectively, and a pair of electrodes guided into said chambers so that they are contacted with the electrolytes. When an anion exchange membrane is used, the electromotive force $V_m$ of this cell is represented by the following formula, assuming that the cation transference number $T_+$ of the cation exchange membrane is 1.0 and the anion transference number $T_-$ of the cation exchange membrane is 0.0:

$$V_m = -\frac{R \cdot T}{F} \ln \frac{a_I^+}{a_{II}^+}$$

wherein $a_I^+$ and $a_{II}^+$ denote the activities of the cation in respective electrolytes, R stands for the gas constant, F denotes the Faraday's constant and T stands for the absolute temperature of the electrolytes.

A similar relation is established also in the case of the anion.

The electromotive force given by the above formula is a theoretical value, and the found value is relatively lower than this theoretical value. For example, when a saline solution of 0.2 molarity and when a saline solution of 0.02 molarity are guided to two chambers partitioned by a cation exchange, and when the electromotive force of the so formed concentration cell exhibited an electromotive force of 49.2 mV. In this case, the theoretical value of the electromotive force is 55 mV. The reason why such an electromotive force is obtained in the concentration cell of the above structure will now be described in brief.

When electrolytes differing in the concentration are located adjacently through an intermediate cation exchange membrane, a force causing transference of the cation ($Na^+$ ion) from the high concentration side to the low concentration side is generated, whereby the cation is transferred to the low concentration side from the high concentration side through the cation exchange membrane. As a result, the anion becomes excessive on the high concentration side and the cation becomes excessive on the low concentration side, and therefore, a potential difference is brought about between the two electrolytes. In where an anion exchange membrane is used as the ion exchange membrane, the anion is transferred from the high concentration side to the low concentration side, and a potential difference is brought about between the electrolytes and an electromotive force is generated in the same manner as in the case of the cation exchange membrane. Of course, the polarity is reversed between the cell using a cation exchange membrane and a cell using an anion exchange membrane.

When cells using a cation exchange membrane and cells using an anion exchange membrane are connected in series alternately, a higher voltage can be obtained. In this case, a low concentration electrolyte can be held in common by two adjacent high concentration cells and a high concentration electrolyte can also be held in common by two adjacent low concentration cells. Accordingly, a concentration cell for obtaining a high voltage can be constructed by providing a plurality of chambers defined or partitioned by cation exchange membranes and anion exchange membranes arranged alternately and guiding a high concentration electrolyte and a low concentration electrolyte alternately into these chambers. In this structure, the electromotive force arises between a pair of electrodes guided to the chambers and disposed on both the ends of the cell assembly. This electromotive force generates an open circuit voltage of the cell. When the open circuit voltage is higher than the decomposition voltage of water, if both the electrodes are electrically connected to each other under no load or under a light load, an electric current is caused to flow therebetween and hydrogen gas is generated from one of the electrodes.

In the hydrogen-generating apparatus of the present invention, it is important that the open circuit voltage of the cell should be higher than the decomposition voltage of water. In order to obtain hydrogen at a high efficiency on an industrial scale, it is preferred that the open circuit voltage is made higher than the theoretical decomposition voltage of water by a value corresponding to the sum of the hydrogen over-voltage determined by an electrode constituting material and the voltage drop caused by the interior resistance of the cell.

In order to obtain hydrogen continuously, it is necessary to maintain the concentration difference in the electrolytes fed to the chambers at a certain constant level. Accordingly, it is necessary to feed electrolytes continuously. In this case, care should be taken so that no short circuit is formed between the adjacent chambers through the electrolyte and that if such short circuit is formed, the resistance between the chambers is maintained at a high level. In view of the feeding efficiency, it is practically preferred to adopt a system in which two supply sources are provided for the low concentration electrolyte and high concentration electrolyte, respectively, and the two electrolytes are fed in series or in parallel to the respective chambers. In case chambers to which the same electrolyte is supplied are connected in series, occurrence of short circuits is effectively prevented or reduced by increasing sufficiently the lengths of conduits connecting these chambers to one another or decreasing diameters of these conduits or by interposing a drip feeder in such conduits between series connected chambers. In case chambers to which the same electrolyte is supplied are connected in parallel, drip feeders are disposed in electrolyte supply conduits so that the chambers are electrically separated from one another, whereby occurrence of short circuits is effectively prevented or reduced.

In actually working the hydrogen generating apparatus of the present invention, in view of the disposal of the exhaust liquid and from the economical viewpoint, it is preferred to use electrolytes repeatedly. When the electrolytes are used repeatedly, the concentration is reduced in the high concentration electrolyte but is increased in the low concentration electrolyte, and therefore, the concentration difference between the two electrolytes becomes small. If the concentration difference is small between the two electrolytes, the open circuit voltage is lowered and finally, it becomes lower than the decomposition voltage of water. At this point, generation of hydrogen is stopped. Therefore, in case electrolytes are used repeatedly, it is necessary to restore the concentration of the electrolyte discharge from each chamber to the original level and to recycle the concentration restored electrolyte to the chamber. A simple method for regeneration of electrolytes is a method in which the high concentration electrolyte is heated to evaporate water and concentrate the electrolyte and water evaporated is supplied to the low concentration electrolyte. In this case, fresh electrolytes should be replenished in amounts corresponding to the amounts consumed for generation of hydrogen. As the heat source for the concentration, there may be employed solar energy, nuclear energy, heat discharged from a thermal power plant and heat discharge from other industrial plants and equipments. As the evaporator used with the heat source, there may be employed, a solar water heater, a flash evaporator customarily used for desalination of sea water and a boiler which is used when the heat discharged from the thermal power plant is to be utilized. As the steam condenser, there may be employed a gas cooler in which city service water is used as a cooling medium and a condenser in which sea water is used as a cooling medium. The dimension of the steam condenser can optionally be chosen.

In the hydrogen generating apparatus of the present invention having the above mentioned structure, with a pair of electrodes electrically connected and an electric current caused to flow therebetween, generation of hydrogen is continuous. Preferred materials for the main constituent elements of the hydrogen generating apparatus of the present invention, namely the electrodes, electrolytes and ion exchange membranes, and preferred operation conditions will now be described.

Use of electrode materials that are insoluble in electrolytes and have a low over-voltage, such as Pt and Au, are preferred. However, from the economical viewpoint, Fe, Ni and graphite may be used instead of these expensive materials.

It is preferred to use electrolytes in which the cation transference number and the anion transference number are substantially equal to each other and cations such as alkali metals and alkaline earth metals do not deposit on the electrode surface. As such preferred electrolytes, there can be mentioned sodium hydroxide, potassium hydroxide, sodium sulfate, potassium sulfate, sodium chloride and potassium chloride. Among them, sulfates and hydroxides are most preferred, because oxygen and hydrogen are obtained by electrolysis of them and no by-product is formed as electrolysis advances.

Commercially available ion exchange membranes include those suitable for permeation of cations and anions of various electrolytes, and these membranes can be used as they are. For example, commercially available ion exchange membranes for desalination of sea water, which are illustrated in Table 1 given below, can be used in the present invention.

TABLE 1

| Tradename of Membrane | Manufacturer | Transference Number |
|---|---|---|
| AMF tonC60 | American Machine & Foundry Co. | 0.2 mole/0.1 mole, KCl 0.96 |
| AMF ton C103C | " | KCl 0.99 |
| AMF ton A60 | " | KCl 0.97 |
| AMF ton A104B | " | KCl 0.99 |
| Nalftpm 1 | Nalco Chemical Co. | 0.5 mole/1.0 mole, NaCl 0.86 |
| Nalftpm 2 | " | NaCl 0.93 |
| Neptnn CR61 | Ionics Inc. | NaCl 0.75 |
| Neptnn AR111A | " | NaCl 0.88 |

TABLE 1-continued

| Tradename of Membrane | Manufacturer | Transference Number |
| --- | --- | --- |
| Selemion CMG-10 | Asahi Glass Co. | NaCl 0.91 |
| Selemion CMG-20 | " | NaCl 0.80 |
| Selemion CSG | " | 0.92 |
| Selmion AMG-10 | " | 0.94 |
| Selemion AMT-20 | " | 0.78 |
| Selemion ASG | " | 0.94 |
| Selemion DMT | " | 0.93 |

It is preferred that the spacing between two adjacent ion exchange membranes be made as narrow as possible, because the electric resistance of the electrolytes between the electrodes can be reduced. In general, better results are obtained when the spacing between adjacent ion exchange membranes is about 1 to about 3 mm.

In the hydrogen generating apparatus having the above structure, hydrogen can be generated without supplying an electric power from the outside. Further, use of fossil fuel, which has been used in the conventional hydrogen generating apparatus, is quite unnecessary. Accordingly, it is possible to continue generation of hydrogen permanently. Moverover, the apparatus of the present invention does not cause environmental pollution, and since the amount of hydrogen generated per unit electric current is comparable to that in the conventional techniques, the hydrogen generating apparatus of the present invention is very advantageous from the economical viewpoint.

This invention will now be described in detail by reference to embodiments shown in the accompanying drawings.

DETAILED DESCRIPTION OF THE PREFERRED EMBODIMENTS

Figure 1:
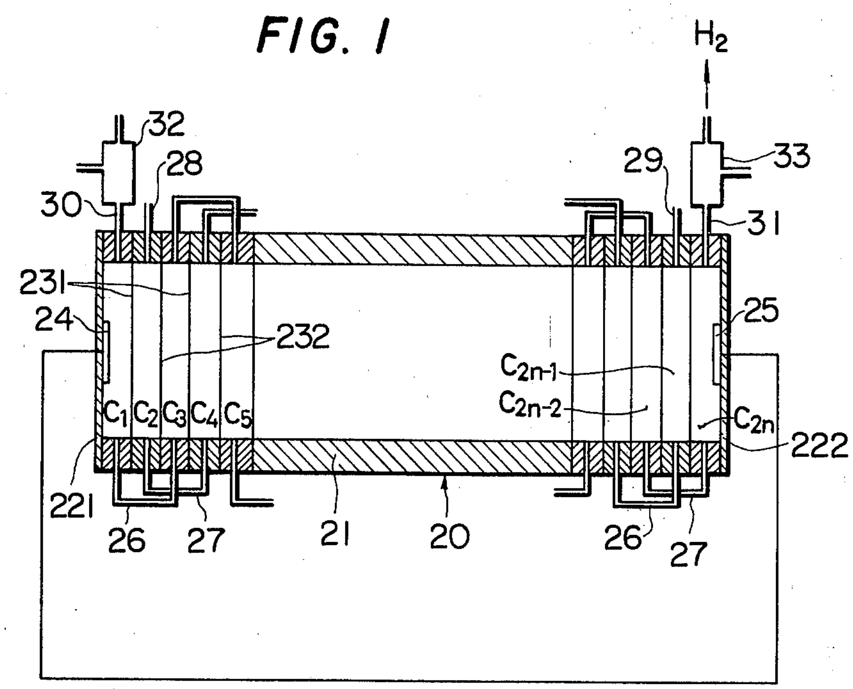
FIG. 1 is a sectional diagram illustrating the main part or generating cell of one embodiment of the hydrogen generating apparatus of the present invention.

Referring to FIG. 1, a cell 20 includes a cylindrical or square side wall 21 and end plates 221 and 222 blocking both the open ends of the cylindrical or square side wall 21, and this cell 20 is divided into a plurality of chambers $C_1$, $C_2$, . . . $C_{2n-1}$ and $C_{2n}$ in the direction connecting both the ends by cation exchange membranes 231 and anion exchange membranes 232. A pair of electrodes 24 and 25 are fixed to the end plates 221 and 222 on the chamber sides thereof, respectively. Conduits 26 are disposed to connect chambers $C_1$, $C_3$, . . . $C_{2n-1}$, namely the chambers in odd numbers counted from the side plate 221, to one another. Similarly conduits 27 are disposed to connect chambers in even numbers counted from the side plate 221, namely chambers $C_2$, $C_4$, . . . $C_{2n}$, to one another. Inlet pipes 28 and 29 are connected to the chambers $C_2$ and $C_{2n-1}$ to guide incoming electrolytes, and pipes 30 and 31 are connected to chambers $C_1$ and $C_{2n}$ to discharge electrolytes. Gas-liquid separators 32 and 33 are connected to the pipes 30 and 31. A conductor 34 is disposed to connect electrically the electrodes 24 and 25 to each other.

In the hydrogen generating apparatus having the above illustrated structure, a low concentration electrolyte is guided from the pipe 28 to fill and flow through chambers $C_2$, $C_4$, . . . $C_{2n}$ in even numbers counted from the side plate 221; thereafter it is discharged from 31. A high concentration electrolyte is guided from the pipe 29 to fill and flow through chambers $C_1$, $C_3$, . . . $C_{2n-1}$ in odd numbers counted from the side plate 221; thereafter it is discharged from 30. Hydrogen gas is generated in the chamber $C_{2n}$ in which the electrode 25 is disposed, and the so generated hydrogen is recovered through the pipe 31 and the gas-liquid separator 33. This operation is illustrated in detail in FIG. 2.

Figure 2A:
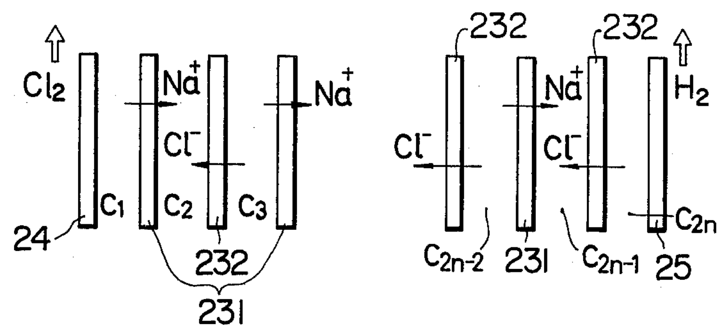
FIG. 2 is a diagram illustrating the operation of the apparatus shown in FIG. 1.
Figure 2B:
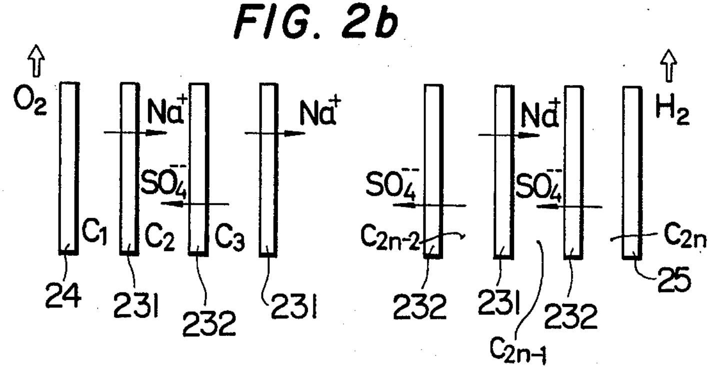

FIG. 2a shows an embodiment in which NaCl solution is used as the electrolyte and FIG. 2b shows an embodiment in which $Na_2SO_4$ solution is used as the electrolyte. As is seen from the drawings FIGS. 2a and 2b, $Na^+$ ions are transferred from the electrode 24 toward the electrode 25 through the cation exchange membrane 231, whereas $Cl^-$ or $SO_4^{--}$ ions are transferred from the electrode 25 toward the electrode 24 through the anion exchange membrane 232. By this ion transference, an electric current flows from the electrode 24 to the electrode 25 in the cell 20, and hydrogen is generated on the side of the electrode 25, whereas chlorine gas or oxygen gas is generated on the side of the electrode 24.

Figure 3:
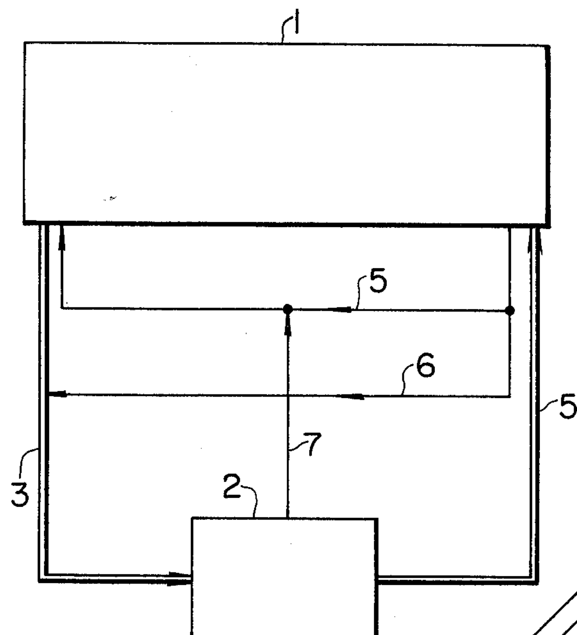
FIG. 3 is a block diagram of another embodiment of the apparatus of the present invention, in which a closed system is adopted.

FIG. 3 is a block diagram of a practical hydrogen generating apparatus. Reference numberal 1 denotes the main part of the hydrogen generating apparatus, for example, the hydrogen generating cell in FIG. 1. A concentrator 2 is disposed to concentrate an electrolyte, and a conduit 3 is laid to introduce into this concentrator 2 a high concentration electrolyte discharged from the concentration cell portion 1. Another conduit 4 is laid to recycle the high and enriched electrolyte to the concentration cell portion 1 from the concentrator 2. A conduit 5 is laid to return the majority of low concentration electrolyte discharged from the cell portion 1 to the cell portion 1, and a conduit 6 is disposed to guide a part of the low concentration electrolyte discharged from the cell portion 1 to the concentrator 2. A conduit 7 is laid to supply water formed by condensation in the concentrator 2 to the low concentration electrolyte passing through the conduit 5.

When electrolyte conduits are arranged in a closed circulation system as described above, concentrations of the electrolytes can bemaintained at constant levels without supplying any additional water or compound except electrolytes replenished in compensation for their consumption in the generation of hydrogen. In this system, therefore, hydrogen can be generated at a constant rate continuously. If concentration of the electrolyte is performed by utilizing solar energy, nuclear energy or waste heat energy in an exhaust gas from a thermal power plant or the like, a great economical advantage can be attained. In case solar energy is utilized, since the energy source is indefinite, generation of hydrogen will be continued permanently.

Two embodiments of the concentrator 2 of FIG. 3 where concentration of the electrolyte and condensation of water are performed by utilizing solar energy will now be described by reference to FIGS. 4 and 5, respectively.

Figure 4:
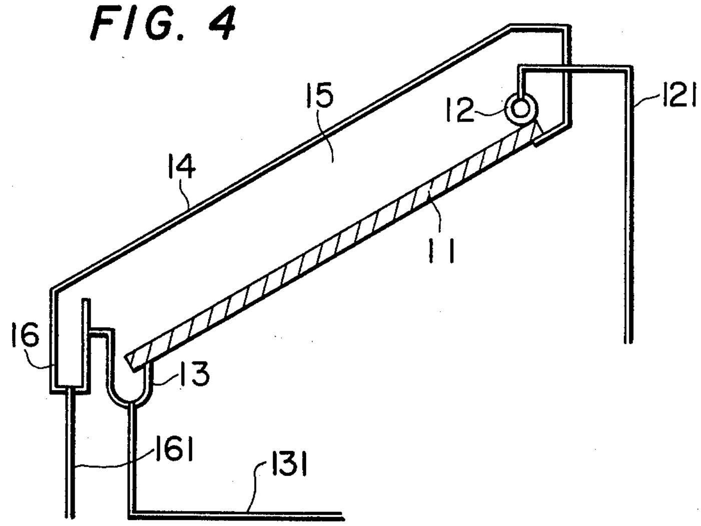

FIG. 4 is a diagram showing a simple apparatus utilizing solar heat, which comprises an inclined black plate 11, a transparent cover 14 covering air-tightly the top face of the black plate 11 so that a space 15 is formed between the plate 11 and the cover 14. An electrolyte sprinkling nozzle 12 is mounted on the upper end side of the space 15, and an electrolyte-receiving gutter 13 is disposed on the lower end side of the space 15 so that it will receive liquid from the lower end portion of the black plate 11. A condensed water-receiving gutter 16 is also disposed on the lower end side of the space 15. These gutters 13 and 16 are arranged so that the gutter 13 receives an electrolyte running downwardly on the black plate 11, the gutter 16 receives condensed water transferred along the back surface of the transparent cover 14 and so that the lower end portion of the space 15 is sealed by the gutters 13 and 16. A conduit 121 is laid to feed the electrolyte to the liquid electrolyte sprinkling nozzle 12, a conduit 131 is laid to take out the concentrated electrolyte from the gutter 13, and a conduit 161 is disposed to take out condensed water from the gutter 16.

In the apparatus having the above structure, the electrolyte, the concentration of which should be increased, is sprinkled over the black plate 11 from the nozzle 12, and the electrolyte is caused to flow downwardly on the black plate 11. While the electrolyte is running on the black plate 11, water is evaporated therefrom by solar heat. The electrolyte concentrated by evaporation of water is collected in the receiving gutter 13 and forwarded to the concentration cell through the conduit 131. Evaporated water is condensed on the back surface of the transparent cover 14 to form drops thereon, and the water drops run along the back surface of the transparent cover 14 and collect in the gutter 16. The so collected condensed water is fed through the conduit 161 to the low concentration electrolyte, the concentration of which should be lowered. The concentration ratio attainable by the apparatus can be approximately expressed in terms of the ratio (Kg/hr) of the quantity of heat received per hour to the evaporation latent heat of 1 Kg water.

Figure 5:
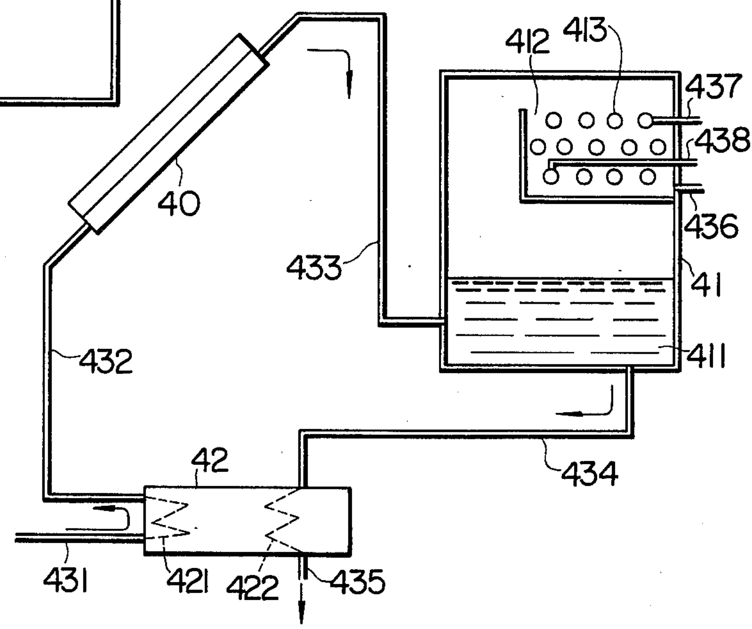
FIG. 4 and FIG. 5 are diagrams showing devices for concentration of the electrolyte and condensation of water, in which solar heat is utilized.

FIG. 5 illustrates an apparatus having in combination a solar water heater 40 (that may be similar in construction to FIG. 4 without the production of steam and condensate) and a flash evaporator 42. Reference numeral 42 denotes a heat exchanger. The flash evaporator 41 comprises a flash chamber 411, a condensing chamber 412 mounted in the upper portion of the flash chamber 411 and cooling pipes 413 arranged in the condensing chamber 412. A conduit 431 is laid to introduce the high concentration electrolyte that is to be concentrated to the primary side 421 of the heat exchanger 42, a conduit 432 is disposed to connect the outlet on the primary side of the heat exchanger 42 to the inlet of the solar water heater 40, a conduit 433 is laid to connect the outlet of the solar water heater 40, to the inlet of the flash chamber 411, a conduit 434 is laid to connect the thus concentrated electrolyte outlet of the flash chamber 411 to the inlet on the secondary side of the heat exchanger 42, a conduit 435 is disposed to conduct the thus cooled and concentrated electrolyte back to the cell; the conduit 436 will take out the condensed water to be used to dilute the low concentration electrolyte, and conduits 437 and 438 are disposed to supply cooling water.

In the apparatus having the above mentioned structure, concentration of the electrolyte and condensation of the water can be accomplished only by pumping an electrolyte to be concentrated along the direction indicated by arrows. More specifically, the electrolyte to be concentrated is first preheated by the heat exchanger 42 and is further heated by the solar water heater 40, and then the electrolyte is guided into the flash chamber 411, where water is removed from the electrolyte by evaporation and the concentration of the electrolyte is thus increased. Then, the concentrated electrolyte is passed through the secondary side of the heat exchanger and supplied to the concentration cell. Steam evaporated from the electrolyte in the flash chamber 411 is introduced into the condensing chamber 412 and contacted with cooling pipes 413, whereby the vapor is condensed to water, which is then discharged from the condensing chamber 412 and is used for dilution of the electrolyte, the concentration of which should be lowered.

Figure 6:
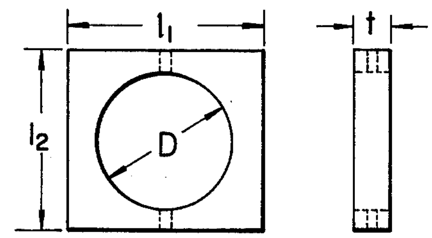
FIG. 6 includes plan and side views of a frame constituting the cell in the apparatus of the present invention.

The cell of FIG. 1 between plates 221 and 222 may be constructed of a plurality of frames, one of which is shown in FIG. 6, stacked with alternating membranes 231 and 232 clamped between adjacent frames. Each frame has outer dimensions $l_1$ and $l_2$, and an inner bore of diameter D; as shown in dotted lines, passages may be drilled radially into the bore for connection with either inlet and outlet lines respectively, 26 or 27.

The present invention will now be described more specifically be reference to the following examples.

EXAMPLE 1

A plurality of frames composed of an acrylic resin, one which is shown in FIG. 6 ($l_1 = l_2 = 80$mm, $t = 3$mm, D = 60mm), were stacked between end plates 221 and 222 and divided by disposing between the frames a plurality of cation exchange membranes and anion exchange membranes, each alternately, to thereby form a cell as shown in FIG. 1. The number of the cation exchange membranes was 50, and the number of the anion exchange membranes was 49. Each electrode was a platinum disc having a diameter of 25mm. The high concentration electrolyte was an aqueous solution containing 20% by weight of NaCl and the low concentration electrolyte was an aqueous solution containing 2% by weight of NaCl. The flow rate of each electrolyte was adjusted to 380 ml/min. In this case, the open circuit voltage was 4.5V. The short circuit current, when a short circuit was generated between the electrodes, was 280 mA. The amount of hydrogen generated was 42 ml/20 minutes. In this example, the molar concentration of the high concentration electrolyte was 3.42 mole/l and the molar concentration of the low concentration electrolyte was 0.34 mole/l.

EXAMPLE 2

Conditions required for continuous operation of the cell (hydrogen generating apparatus) described in Example 1 by performing the concentration, evaporation and condensation according to the system shown in FIG. 3 were determined to obtain the following results:

| | |
|---|---|
| Amount of hydrogen generated: | $3.75\times10^{-3}$ mole/hr |
| Amount transferred of $Na^+$ ion and $Cl^-$ ion per ion exchange membrane: | $7.5\times10^{-3}$ g-ion/hr |
| Amount transferred of NaCl: | 0.37 mole/hr (0.02 mole/l) |
| Flow rate of electrolyte: | 22.8 l/hr |
| Outlet concentration of high con- | |

-continued

| | |
|---|---|
| centration electrolyte: | 3.44 mole/l |
| Outlet concentration of low concentration electrolyte: | 0.36 mole/l |
| Amount evaporated in concentrator (amount of low concentration electrolyte to be fed to concentrator): | 1.4 l/hr |
| Amount formed of NaOH: | $7.5\times10^{-3}$ mole/hr |
| Amount added of HCl: | $7.5\times10^{-3}$ mole/hr |

EXAMPLE 3

A cell (hydrogen generating apparatus) was constructed in the same manner as in Example 1 except that the dimension of the frame of an acrylic resin shown in FIG. 6 was changed as follows:

$l_1$, $l_2$: 240 mm
D: 200 mm
$t$: 1 mm

The following results were obtained:

Open circuit voltage: 4.5 V
Short circuit current: 2800 mA
Amount generated of hydrogen: 580 ml/30 minutes

EXAMPLE 4

Conditions required for continuous operation of the cell (hydrogen generating apparatus) described in Example 3 by performing the concentration, evaporation and condensation according to the system shown in FIG. 3 were determined to obtain the following results:

| | |
|---|---|
| Amount generated of hydrogen: | $5.2\times10^{-3}$ mole/hr |
| Amount transferred of $Na^+$ ion and $Cl^-$ ion per ion exchange number: | 0.104 g-ion/hr |
| Amount transferred of NaCl: | 5.10 mole/hr (0.224 mole/l) |
| Flow rate of electrolyte: | 22.8 l/hr |
| Outlet concentration of high concentration electrolyte: | 3.20 mole/l |
| Outlet concentration of low concentration electrolyte: | 0.5 mole/l |
| Amount evaporated in concentrator (amount of low concentration electrolyte to be fed to concentrator): | 8.89 l/hr |
| Amount formed of NaCl: | 0.104 mole/hr |
| Amount added of HCl: | 0.104 mole/hr |

In the foregoing examples, NaCl solution was used as the electrolyte. In case $Na_2SO_4$ solution was used instead of NaCl, dilution could be effected by employing water instead of HCl used in the foregoing examples.

While a specific preferred embodiment of the present invention has been shown and described in detail, with particular and specific advantages being attributable to such details, variations, modifications and further embodiments are contemplated according to the broader aspects of the present invention, all as defined by the spirit and scope of the following claims.

What is claimed is:

1. A hydrogen generating method, comprising:

(1) providing a cell having a casing, and first and second electrodes on the opposite ends of said casing;

(2) providing a plurality of cation and anion exchange membranes disposed in said casing in a manner that said cation and anion exchange membranes are alternately arranged between said electrodes and are spaced from each other to define a plurality of chambers, with each chamber constituting the space encompassed by a cation exchange membrane, an adjacent anion exchange membrane and said casing, and electrically isolating with said casing and membranes each chamber from the adjacent chambers and transferring only cations and anions from one chamber to an adjacent chamber through the respective membranes;

(3) introducing a first aqueous electrolyte into every other one of said chambers;

(4) introducing a second aqueous electrolyte of the same kind as said first electrolyte into said other chambers, while maintaining the second electrolyte at a concentration lower than that of the first electrolyte;

(5) heating part of the first electrolyte outside of said chambers to concentrate the first electrolyte by vaporizing water therein and removing the vaporized water from the first electrolyte;

(6) introducing water into said other chambers containing the second electrolyte to dilute the second electrolyte so as to maintain a predetermined concentration difference between the first and second electrolytes; and (7) maintaining the number of said chambers at least enough so that the sum of the theoretical decomposition voltage of water to be generated across said electrodes, a voltage drop due to the hydrogen over-voltage determined by the material of said electrodes and a voltage drop due to the interior resistance of the cell is high enough to decompose the water in the electrolyte to generate hydrogen at one of said electrodes when said electrodes are electrically interconnected in an electrical path electrically parallel to the chambers.

2. The hydrogen generating method of claim 1, wherein said step of heating employs solar energy as its energy source.

3. The hydrogen generating method of claim 1, wherein said step of heating employs waste exhaust heat as its energy source.

4. The hydrogen generating method of claim 1, wherein said step of heating employs a low density energy as its energy source.

5. The hydrogen generating method of claim 1, wherein said step of introducing water employs the water removed by said step of heating and additional makeup water to replace the water consumed in the generation of hydrogen.

6. A hydrogen generating apparatus, comprising:

(1) a cell having a casing, and first and second electrodes on the opposite ends of said casing;

(2) a plurality of cation and anion exchange membranes disposed in said casing in a manner that said cation and anion exchange membranes are alternately arranged between said electrodes and are spaced from each other to define a plurality of chambers, with each chamber constituting the space encompassed by a cation exchange membrane, an adjacent anion exchange membrane and said casing, said casing and membranes including means to electrically isolate each chamber from the adjacent chambers and further to permit transference of only cations and anions from one chamber to an adjacent chamber through the respective membranes;

(3) means fluid connected with every other one of said chambers to introduce a first aqueous electrolyte into every other one of said chambers;

(4) means fluid connected to the other of said chambers to introduce a second aqueous electrolyte of the same kind as the first electrolyte into said other chambers, with the second electrolyte having a concentration lower than that of the first electrolyte.

(5) concentrating means to heat part of the first electrolyte outside of said chambers to concentrate the first electrolyte by vaporizing water therein and removing the vaporized water from the first electrolyte;

(6) diluting means to introduce water into said other chambers containing the second electrolyte to dilute the second electrolyte so as to maintain a predetermined concentration difference between the first and second electrolyte; and (7) the number of said chambers being at least enough so that the sum of the theoretical decomposition voltage of water to be generated across said electrodes, a voltage drop due to the hydrogen overvoltage determined by the material of said electrodes and a voltage drop due to the interior resistance of the cell is high enough to decompose the water in the electrolyte to generate hydrogen gas at one of said electrodes when said electrodes are electrically interconnected in an electrical path electrically parallel to the chambers.

7. A hydrogen generating apparatus as set forth in claim 6, wherein said concentrating means to heat employs a low density energy source.

8. The hydrogen generating apparatus of claim 6, wherein said concentrating means to heat employs solar energy as its energy source.

9. The hydrogen generating apparatus of claim 6, wherein said concentrating means to heat employs waste exhaust heat as its energy source.

10. The hydrogen generating apparatus of claim 6, wherein said diluting means obtains the water, removed by said concentrating means and introduced it into said other chambers, and further including means supplying makeup water to the chambers to replace the water consumed in the generation of hydrogen.

11. The hydrogen generating apparatus as set forth in claim 6, including a first aqueous electrolyte filling said every other one of said chambers; and a second aqueous electrolyte filling said other chambers and having a cation and anion ion concentration of the same kind as said first electrolyte and of a concentration substantially lower than the concentration of said first electrolyte.

12. A hydrogen generating apparatus as set forth in claim 6, wherein each of said electrodes is composed of a material selected from the group consisting of gold, platinum, iron, nickel and graphite.

13. A hydrogen generating apparatus as set forth in claim 6, including first and second electrolytes respectively within said chambers which comprise an electrolyte in which the cation is the ion of a metal selected from the group consisting of alkali metals and alkaline earth metals.

* * * * *